US008073451B2

(12) United States Patent
Nobukiyo (10) Patent No.: US 8,073,451 B2
(45) Date of Patent: Dec. 6, 2011

(54) SYSTEM AND METHOD FOR WIRELESS RESOURCE ALLOCATION, AND BASE STATION USED THEREFOR

(75) Inventor: Takahiro Nobukiyo, Tokyo (JP)

(73) Assignee: NEC Corporation, Tokyo (JP)

( * ) Notice: Subject to any disclaimer, the term of this patent is extended or adjusted under 35 U.S.C. 154(b) by 1097 days.

(21) Appl. No.: 11/727,272

(22) Filed: Mar. 26, 2007

(65) Prior Publication Data

US 2007/0232318 A1 Oct. 4, 2007

(30) Foreign Application Priority Data

Mar. 29, 2006 (JP) .................................. 2006-089798

(51) Int. Cl.
*H04W 4/00* (2009.01)
(52) U.S. Cl. ......... 455/450; 370/328; 370/329; 370/338
(58) Field of Classification Search .................. 370/329, 370/328, 338; 455/450
See application file for complete search history.

(56) References Cited

U.S. PATENT DOCUMENTS

| 2005/0041618 A1* | 2/2005 | Wei et al. ........................ 370/328 |
| 2005/0117536 A1* | 6/2005 | Cho et al. ....................... 370/328 |
| 2007/0232318 A1* | 10/2007 | Nobukiyo ..................... 455/450 |

FOREIGN PATENT DOCUMENTS

| JP | 2006-060789 | 3/2006 |
| WO | WO 2004/098222 A1 | 11/2004 |

OTHER PUBLICATIONS

3GPP TS25.321 v6.5.0 (Jun. 2005) "3rd Generation Partnership Project; Technical Specification Group Radio Access Network; medium access control (MAC) protocol specification (Release 6)", p. 48.
3GPP TR25.814 v1.0.1 (Nov. 2005) "3rd Generation Partnership Project; Technical Specification Group Radio Access Network; Physical Layer Aspects for Evolved UTRA (Release 7)", p. 41.
Japanese Office Action dated Jan. 25, 2011 with a partial English translation.

\* cited by examiner

*Primary Examiner* — Pierre-Louis Desir
(74) *Attorney, Agent, or Firm* — McGinn IP Law Group, PLLC (57) ABSTRACT

In a mobile communication system, useless allocation of wireless resources is avoided and utilization efficiency of wireless resources is improved. A base station operating section of a base station is provided with respective functions for: measuring an RTWP which is a total receiving power; reading a format of a transport block transmitted by E-DPDCH; and measuring a transfer rate of each mobile station. In addition, a buffer size calculation section of the base station calculates an estimated buffer size at the time of transmission by a mobile station using an allocated power resource. An allocated power resource section calculates a power resource to be allocated to each mobile station, and notifies a power resource to be allocated to a mobile station via the base station operating section.

18 Claims, 8 Drawing Sheets

| E_TFC Index | TBS [ bits ] | E_DPDCH Offset ($Squ \beta_d$) | AG Index |
|---|---|---|---|
| — | 0 | 0 | 1 |
| 1 | 354 | $(34/15)^2$ | 9 |
| 2 | 690 | $(47/15)^2$ | 12 |
| 3 | 1024 | $(60/15)^2$ | 14 |
| 4 | 1362 | $(75/15)^2$ | 15 |
| 5 | 1698 | $(84/15)^2$ | 16 |

SYSTEM AND METHOD FOR WIRELESS RESOURCE ALLOCATION, AND BASE STATION USED THEREFOR

BACKGROUND OF THE INVENTION

1. Field of the Invention

The present invention relates to a system and method for wireless resource allocation, and a base station used therefor, and more specifically, to a wireless resource allocation scheme in a system for performing high speed uplink packet transfer.

2. Description of the Prior Art

In a system using an EUDCH (Enhanced Uplink Dedicated Channel), which is a high speed uplink packet transfer scheme for WCDMA (Wideband Code Division Multiple Access), a base station performs scheduling, and a mobile station performs packet transfer on an uplink based on the scheduling.

A mobile station in the system using EUDCH transmits a DPCCH (Dedicated Physical Control Channel), an E-DPCCH (Enhanced-Dedicated Physical Control Channel) and an E-DPDDH (Enhanced-Dedicated Physical Data Channel) on an uplink. A closed loop-type control is performed on the transmission power of the DPCCH at the base station so as to satisfy predetermined reception quality.

Transmission power of E-DPDCH for data transfer performs transmission at a power obtained by adding a predetermined power offset to the transmission power of the DPCCH. The higher the transfer rate, the higher the power offset must be. In addition, transmission power of the E-DPCCH for control is basically a power obtained by adding a predetermined power offset to the transmission power of DPCCH.

In order to maintain communication at a predetermined quality, the base station must control total reception power so that the total reception power, or the ratio of total reception power to thermal noise (noise rise) is equal to or lower than a predetermined threshold. Therefore, the base station will perform scheduling on a mobile station so that the total reception power or noise rise will be equal to or lower than a predetermined threshold to control an available power offset SG (Serving Grant) that represents a wireless resource or, in other words, a power resource of a mobile station.

In addition, during E-DPDCH transmission, a mobile station is capable of notifying a buffer size representing data size to be transmitted, and a Power Headroom representing wireless communication quality, as scheduling information (for instance, refer to 3GPP TR25.321 V6.5.0 (2005-06) "3rd Generation Partnership Project; Technical Specification Group Radio Access Network; Medium Access Control (MAC) protocol specification (Release 6)", p. 48). A base station determines power resources to be allocated using scheduling information. Power Headroom represents power obtained by subtracting DPCCH transmission power from a maximum transmission power of a mobile station. Since the higher the Power Headroom, the greater the power allocatable to E-DPDCH, a high transfer rate may now be selected.

On the other hand, a mobile station selects a transmission format of a transport block to be transmitted at a unit transmission time (TTI: Transport Time Interval) on a physical layer from a usable power offset range. The transmission format of a transport block is referred to as an E_TFC (Enhanced Transport Format Combination). An E_TFC table is comprised of an E_TFC index corresponding to a power offset, and a transport block size (TBS) or the like.

Furthermore, 3GPP (3rd Generation Partnership Project) is presently evaluating an EUTRA (Evolved UTRA [Universal Terrestrial Radio Access]) system, which is an expansion of the WCDMA system. In regards of the EUTRA system, discussions are ongoing mainly over SC-FDMA (Single Carrier-Frequency Division Multiple Access) as an uplink wireless access scheme (for instance, refer to 3GPP TR25.814 V1.0.1 (2005-11) 3rd Generation Partnership Project; Technical Specification Group Radio Access Network; Physical Layer Aspects for Evolved UTRA (Release7)", p. 41), wherein transmitting bands will be allocated as wireless resources. It is conceivable that, in an uplink of an EUTRA system, the base station will determine wireless resources to be allocated using scheduling information of the size of data to be transmitted and the like, in the same manner as in the case of EUDCH.

Figure 8:
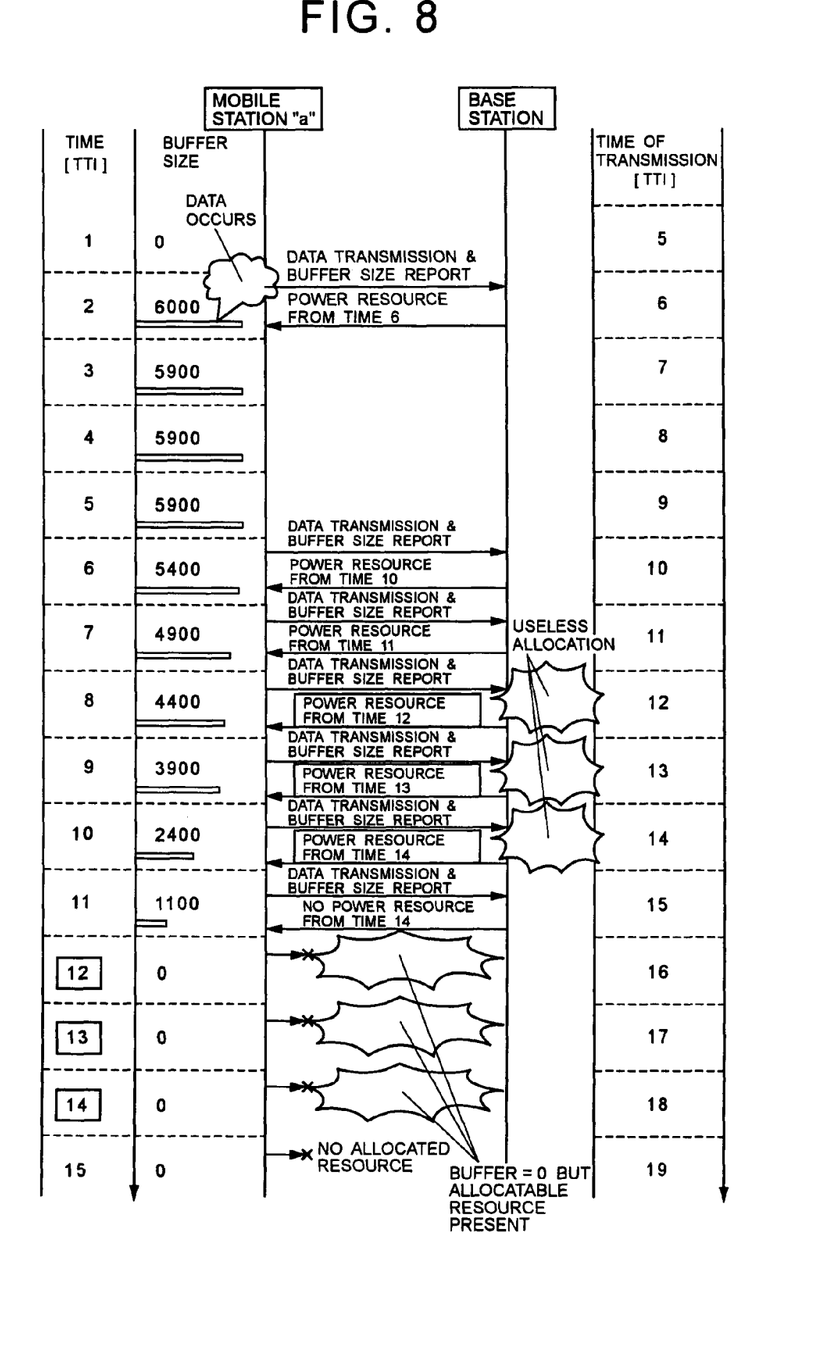
FIG. 8 is a diagram showing timings at which a base station allocates wireless resources, timings at which a mobile station transmits data by EUDCH, and a time series of buffer size at the mobile station.

However, the above-described wireless resource allocation method according to EUDCH has the following problem. The problem existing in the wireless resource allocation method will now be described with reference to FIG. 8. FIG. 8 shows timings at which a base station allocates wireless resources, timings at which a mobile station "a" transmits data, and a time series of buffer size at the mobile station "a".

In FIG. 8, the processing time from allocation of a power resource by the base station to transmission by the mobile station "a" based on the allocated power resource is assumed to be 4 TTIs. For instance, a power resource allocated at time 2nd TTI by the base station may be used by the mobile station "a" from time 6-th TTI. It is additionally assumed that, upon an initial occurrence of transmission data, the mobile station "a" is capable of performing one transmission using a predetermined transport block regardless of presence of an allocated power resource (at time 2nd TTI). Furthermore, the mobile station "a" transmits scheduling information during data transmission by EUDCH.

At this point, as shown in FIG. 8, when allocation of a power resource of the mobile station "a" is performed using a buffer size notified from the mobile station "a", a power resource allocated at time 8 to 10-th TTI will be nullified since the buffer size is 0 at time 12 to 14-th TTI, which is the time of transmission. At this point, utilization efficiency of the power resource may be improved if the power resource is allocated to a mobile station other than the mobile station "a" under the base station. Useless allocation of a power resource occurs because the report time of the buffer size of the mobile station "a" differs from the time of transmission using the power resource allocated based on the buffer size.

This problem is not unique to WCDMA systems, and may occur in any system in which a base station performs scheduling of a mobile station in a wireless mobile communication system, due to the difference between the time at which a scheduler allocates a wireless resource and the time at which a mobile station actually performs transmission using the allocated resource.

Therefore, since a report time of a buffer size of a mobile station and a time at which a wireless resource determined based on the buffer size similarly differ in an EUTRA system using SC-FDMA, a problem arises in that a wireless resource or, in other words, a transmission band is uselessly allocated. In this case, since SC-FDMA does not allow a plurality of users to be allocated to the same transmission band, when a wireless resource is uselessly allocated, no mobile station will be able to transmit data using the transmission band during such allocation.

Therefore, an object of the present invention is to solve the above-described problem, and to provide a wireless resource allocation system and method thereof, and a base station used therein, which are capable of avoiding useless allocation of wireless resources and improving utilization efficiency of wireless resources.

BRIEF SUMMARY OF THE INVENTION

A wireless resource allocation method according to the present invention is a wireless resource allocation method in which a base station determines an uplink wireless resource available to a mobile station, the method comprising: a first step in which the mobile station notifies the base station of data size to be transmitted; a second step in which the base station measures a communication quality of the mobile station; a third step in which the base station uses the data size and the communication quality to calculate an estimated data size at the time of transmission based on a wireless resource to be allocated to the mobile station; and a fourth step in which the base station determines a wireless resource to be allocated to the mobile station based on the estimated data size.

A wireless resource allocation system according to the present invention is a wireless resource allocation system in which a base station determines an uplink wireless resource available to a mobile station, the system comprising: first means provided at the mobile station for notifying the base station of data size to be transmitted; second means provided at the base station for measuring a communication quality of the mobile station; third means provided at the base station for using the data size and the communication quality to calculate an estimated data size at the time of transmission based on a wireless resource to be allocated to the mobile station; and fourth means provided at the base station for determining a wireless resource to be allocated to the mobile station based on the estimated data size.

A base station according to the present invention is a base station that determines an uplink wireless resource available to a mobile station, the base station comprising: means for measuring a communication quality of the mobile station; means for using a data size to be transmitted, notified from the mobile station to the base station, and the communication quality to calculate an estimated data size at the time of transmission based on a wireless resource to be allocated to the mobile station; and means for determining a wireless resource to be allocated to the mobile station based on the estimated data size.

DETAILED DESCRIPTION OF THE PREFERRED EMBODIMENTS

Figure 1:
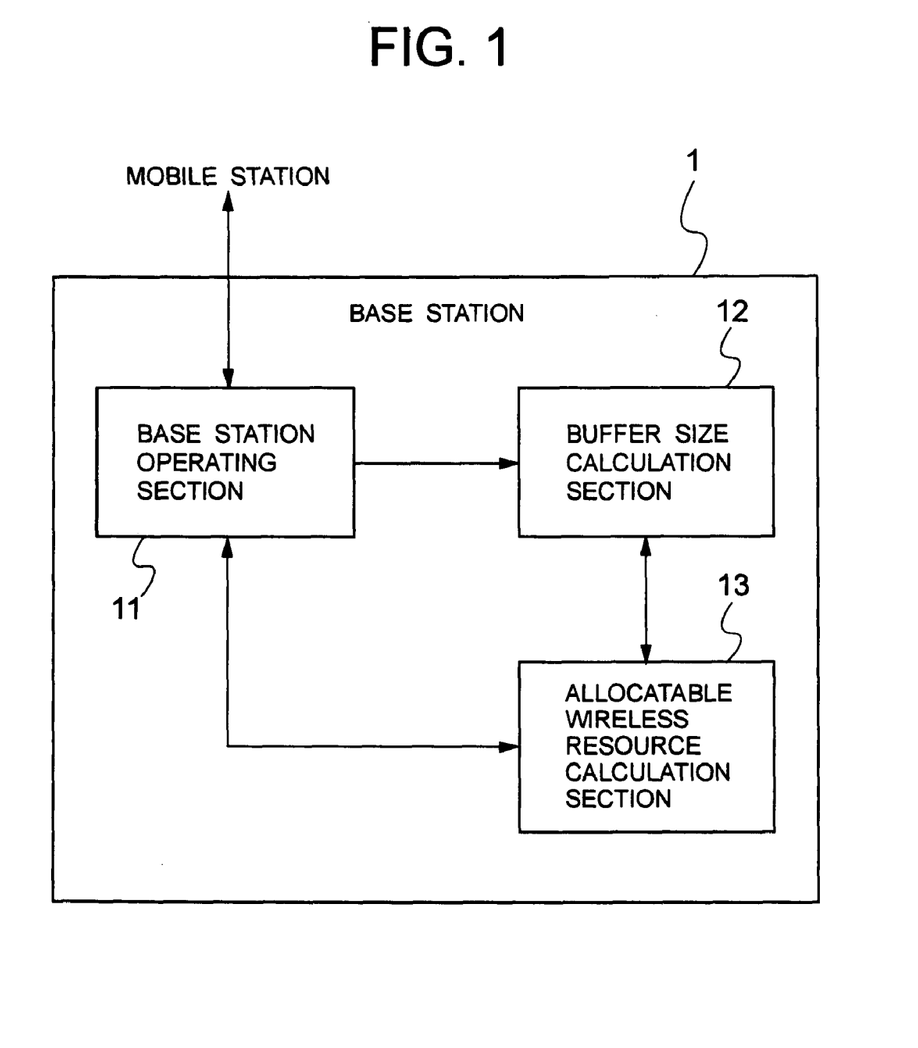
FIG. 1 is a block diagram showing a configuration of a base station according to an embodiment of the present invention.

An embodiment of the present invention will now be described with reference to the drawings. FIG. 1 is a block diagram showing a configuration of a base station according to an embodiment of the present invention. In FIG. 1, a base station 1 is composed of a base station operating section 11 connected to a plurality of mobile stations which are not shown, a buffer size calculation section 12, and an allocatable wireless resource calculation section 13. The base station 1 operates as a wireless resource allocation apparatus. For the present invention, an exemplary description will be provided for EUDCH, which is a high speed packet transfer scheme on a 3GPP uplink.

Since the base station operating section 11 has a function similar to a base station used in a WCDMA system, and since a configuration and operations of such a base station are well-known, a description thereof will be omitted. In the present embodiment, the base station operating section 11 is provided with general functions of: measuring an RTWP (Received Total Wideband Power), which is a total receiving power; measuring a DPCCH receiving power of each mobile station; reading a format of a transport block transmitted by E-DPDCH; and reading scheduling information transmitted from each mobile station.

Scheduling information refers to a buffer size representing transmission queue data size, and a PHR (Power Headroom), which is power obtained by subtracting DPCCH transmission power from maximum transmission power of each mobile station. A PHR represents a wireless communication quality, and the greater the value, the greater the power allocatable to EUDCH.

The buffer size calculation section 12 calculates an estimated buffer size at the time of transmission by a mobile station using an allocated power resource. The allocatable wireless resource section 13 calculates a wireless resource to be allocated to each mobile station, and notifies a wireless resource to be allocated to a mobile station via the base station operating section 11.

Figure 2:
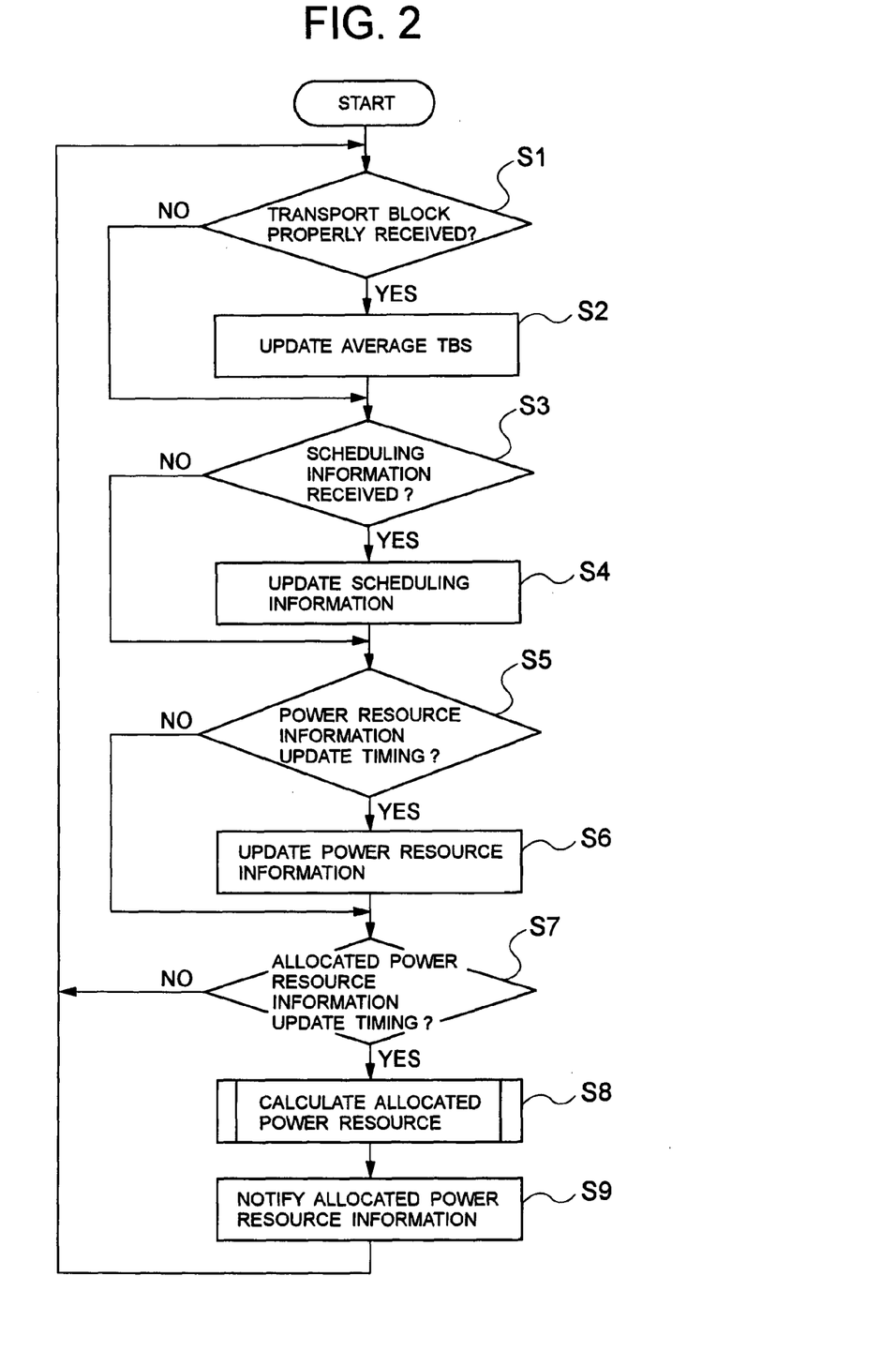
FIG. 2 is a flowchart showing an operation procedure by the base station shown in FIG. 1 for allocating a power resource to a mobile station.

FIG. 2 is a flowchart showing an operation procedure by the base station 1 shown in FIG. 1 for allocating a power resource to a mobile station. Operations by the base station 1 according to an embodiment of the present invention will now be described with reference to FIGS. 1 and 2.

Upon receiving a signal from a mobile station, and as long as the signal is an EUDCH transport block and the signal is properly received (step S1 in FIG. 2), the base station operating section 11 notifies the buffer size calculation section 12 of a reception size (TBS) thereof. The buffer size calculation section 12 uses the reception size (TBS) to update an average reception TBS according to the following formula (step S2 in FIG. 2):

$$\text{Ave}Tbs = W * \text{Ave}Tbs + (1-W) * \text{Ins}Tbs$$

In the formula above, "*" represents a multiplication, AveTbs represents an averaged TBS, InsTbs represents a notified TBS, and W represents a weighting coefficient used in averaging. W may be set to 0. InsTbs is dependent on an instantaneous wireless quality (PHR) of a mobile station, and represents the wireless quality of the mobile station. Therefore, AveTbs represents an expectation of wireless quality of the mobile station.

Upon receiving a signal from a mobile station, and as long as scheduling information is received (step S3 in FIG. 2), the base station operating section 11 notifies the allocatable wireless resource calculation section 13 of the information (step S4 in FIG. 2), and the allocatable wireless resource calculation section 13 stores this information. The allocatable wireless resource calculation section 13 calculates on a per-TTI basis an instantaneous value of a maximum power resource allocatable by the base station 1 by EUDCH according to the following formula:

$$A\_RxEudch(k) = T\_RTWP - (M\_RTWP - \Sigma RxDpcch_i * (Squ\beta_d + Squ\beta_c))$$

At this point, based on A_RxEudch(k), if the base station 1 is at an update timing of an allocatable maximum power resource (step S5 in FIG. 2), update is performed according to the following formula (step S6 in FIG. 2):

$$A\_RxEudch(k) = \Sigma(A\_RxEudch(k))/Nsamp$$

In the above formula, A_RxEudch represents a power resource allocatable to EUDCH (Available Received EUDCH Power), and A_RxEudch(k) (where "k" represents time [TTI]), which is an instantaneous value of A_RxEudch, is calculated by averaging using a number of samples Nsamp of A_RxEudch(k). T_RTWP (Target RTWP) represents a target value of RTWP to be used by the base station as a predetermined threshold of RTWP in order to prevent deterioration of reception quality, while M_RTWP (Measured RTWP) represents an RTWP measured at a predetermined timing.

In addition, $RxD_{pcc}ch_i$ represents a received DPCCH power received from a mobile station "i" which was measured at a predetermined timing, while $Squ\beta_d$ and $Squ\beta_c$ respectively represent a power offset of E-DPDCH and E-DPCCH. $\Sigma$ indicates that the base station 1 calculates a sum of all mobile stations for which the base station 1 is performing EUDCH scheduling. However, among the mobile stations for which the base station 1 is performing scheduling, the $Squ\beta_d$ and $Squ\beta_c$ of mobile stations not performing data transmission by EUDCH will respectively take values of 0. Power offset represents power that is offset in regards to DPCCH. In addition, $Squ\beta_c$ is constant, and is assumed to be known for both the base station and mobile stations.

Upon arrival of an update timing of power resources to be allocated to mobile stations (step S7 in FIG. 2), the allocatable wireless resource calculation section 13 calculates a power resource to be allocated to each station, (step S8 in FIG. 2), and notifies a result thereof to each mobile station via the base station operating section 11 (step S9 in FIG. 2).

Figure 3:
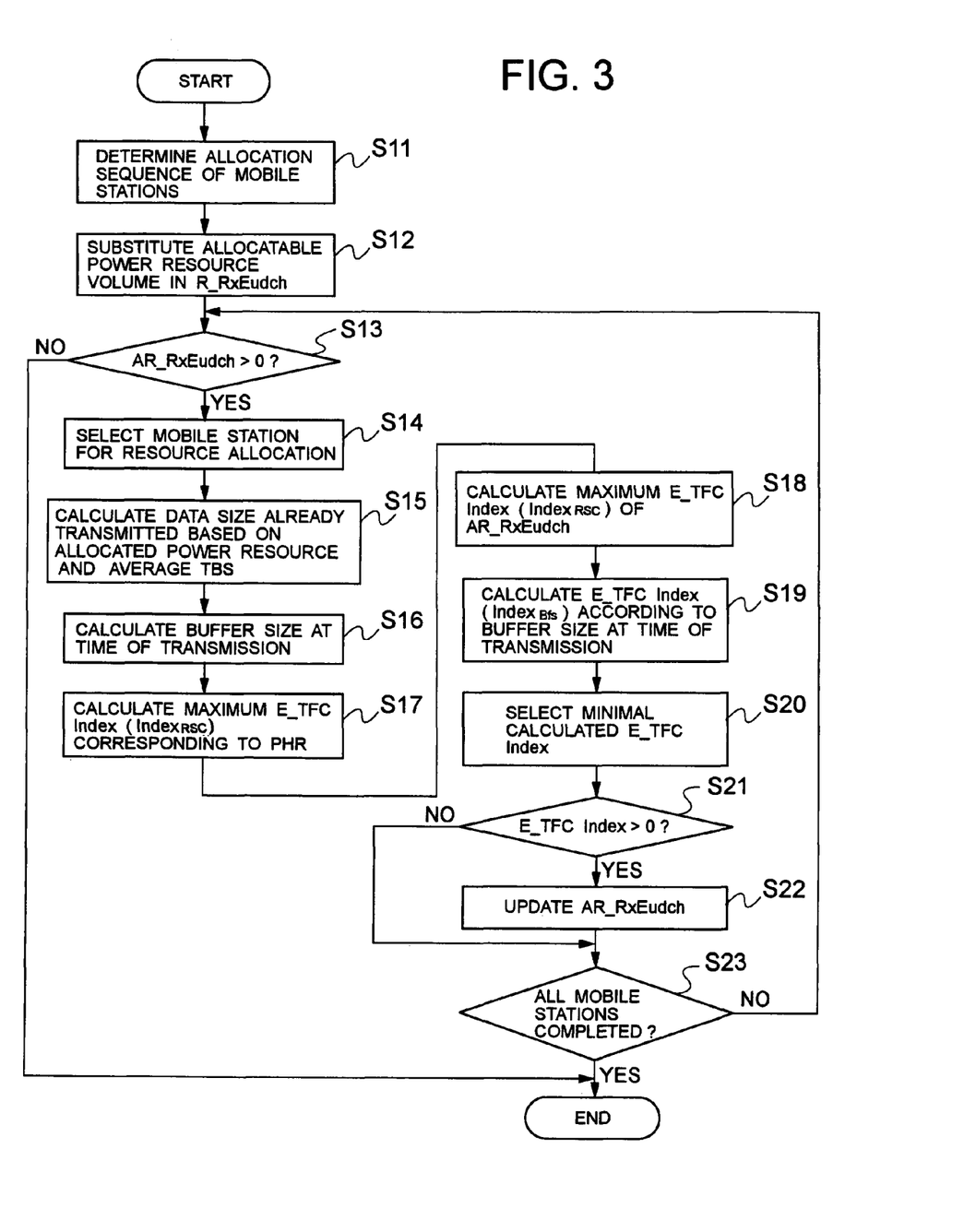
FIG. 3 is a flowchart showing a procedure for calculating a power source to be allocated, performed in step S6 of above-mentioned FIG. 2.

FIG. 3 is a flowchart showing a procedure for calculating a power source to be allocated, performed in step S8 of above-mentioned FIG. 2. A procedure for calculating a power resource to be allocated will now be described with reference to FIG. 3.

The allocatable wireless resource calculation section 13 first determines an allocation sequence for mobile stations that are capable of transmitting data by EUDCH, according to predetermined criteria (step S11 in FIG. 3). The base station performs processing for allocating power resources to mobile stations according to the determined sequence. A plurality of methods such as time of last transmission by EUDCH, PHR size or the like may be employed as the predetermined criteria. For the present invention, any method may be used.

The allocatable wireless resource calculation section 13 substitutes A_RxEudch in AR_RxEudch (Available Remaining Rx EUDCH Power), which represents a remaining power resource allocatable to EUDCH (step S12 in FIG. 3). An AR_RxEudch greater than 0 indicates that a power resource to be allocated to a mobile station remains. If an allocatable power resource remains (step S13 in FIG. 3), the allocatable wireless resource calculation section 13 selects a mobile station to allocate the power resource (step S14 in FIG. 3) based on the allocation sequence determined by the processing of step S11.

The buffer size calculation section 12 uses a power resource already allocated to the selected mobile station and average TBS to calculate a transmitted data size at the time of transmission of the mobile station based on the power resource to be allocated according to the following formula (step S15 in FIG. 3):

$$TransDataSize = (AveTbs * \beta AveTbs) * N$$

In the above formula, $\Delta$ AveTbs represents a coefficient equal to or less than 1, while N represents a number of transmissions that may be performed by the selected mobile station from the time when an allocated power resource is notified to the time when a transmission is performed based on the notified allocated power resource. $\Delta$AveTbs is a coefficient for taking into consideration a transport block error rate or the possibility of a case in which the selected mobile station will not perform transmission, and may be set to different values on a per-mobile station basis or according to AveTbs.

In the present invention, while an estimated buffer size is calculated using a number (N) of possible data transmissions by a selected mobile station, in a case in which a mobile station is continually transmitting data or the like, an estimated buffer size may be calculated using a reported buffer size and an average TBS without using a number of possible transmissions.

The buffer size calculation section 12 calculates an estimated buffer size at the time of transmission according to the following formula using TransDataSize, and notifies the allocatable wireless resource calculation section 13 of the same (step S16 in FIG. 3):

$$EstBfs = MAX(Bfs - TransDataSize, 0)$$

In the above formula, EstBfs represents an estimated buffer size, Bfs represents a buffer size notified from a mobile station, and MAX (A, B) denotes that A and B will be compared to select a greater value. Therefore, EstBfs will take a value equal to or greater than 0.

Figure 4:
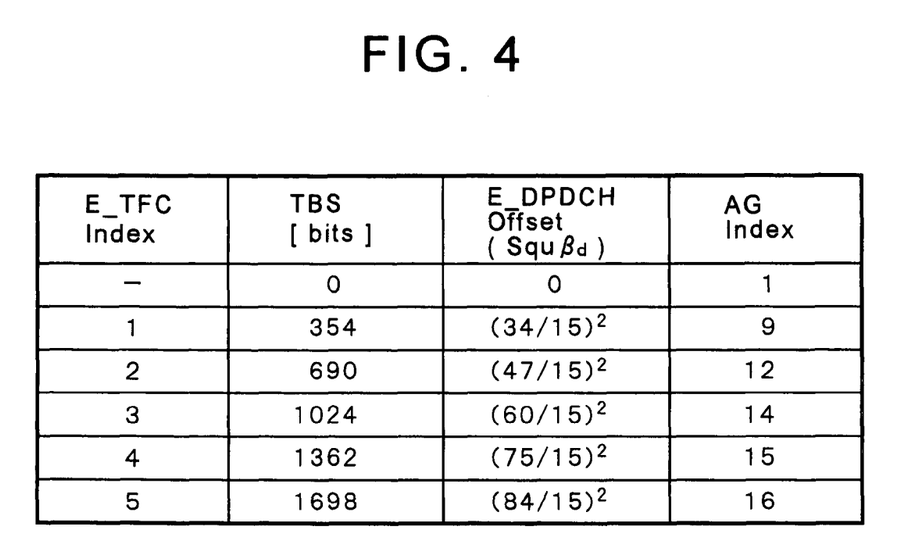
FIG. 4 is a diagram showing a configuration of a table regarding an EUDCH transport block according to an embodiment of the present invention.

FIG. 4 is a diagram showing a configuration of a table regarding an EUDCH transport block according to an embodiment of the present invention. A description of a table of transmission formats of EUDCH transport blocks will now be provided in order to describe processing which will be performed in step S17 and thereafter shown in FIG. 3.

In FIG. 4, a table regarding EUDCH transport blocks indicates an example of a relationship among E_TFC, TBS, and required power offset of E-DPDCH ($Squ\beta_d$). E_TFCs stored in the base station and the mobile stations are indices representing a transport block transmission format. The greater the E_TFC, the greater the TBS as well as the power offset of E-DPDCH.

The base station transmits resource allocation information, referred to as AG Index, to a mobile station to control power resources to be allocated. On the other hand, the mobile station substitutes a $Squ\beta_d$ corresponding to the AG Index in an SG, which is a usable E-DPDCH power offset. However, an AG Index of 0 indicates that a power resource will not be allocated to the mobile station. In this case, the mobile station will not be able to transmit data by EUDCH. Therefore, selecting an E_TFC Index or an AG Index is equivalent to selecting a power resource to be allocated.

Processing performed in step S17 and thereafter in FIG. 3 will now be described based on the description of FIG. 4. First, the allocatable wireless resource calculation section 13 calculates an E_TFC Index (EtfcIndexPHR) corresponding to a maximum $Squ\beta_d$ that satisfies the following formula from a PHR (step S17 in FIG. 3):

$$PHR \geq (Squ\beta_d + Squ\beta_c)$$

This enables calculation of a maximum E_TFC Index selectable based on a transmission power resource of a mobile station. However, in a case in which none of the E_TFC Indexes are satisfactory, it will be assumed that $EtfcIndex_{PHR}=1$. In this case, it is possible that the quality may not be satisfactory, and the power resource will correspond to a minimum TBS.

The allocatable wireless resource calculation section 13 calculates an E_TFC Index (EtfcIndexRSc) corresponding to a maximum $Squ\beta_d$ that satisfies the following formula from an AR_RxEudch (step S18 in FIG. 3):

$$AR\_RxEudch/RxDpcch \geq (Squ\beta_d + Squ\beta_c)$$

This enables calculation of a maximum E_TFC Index selectable based on a remaining power resource allocatable to the EUDCH of the base station 1. The RxDpcch may be measured at a predetermined timing that is different from the RxDpcch used in the above-mentioned step S4, or may be measured at the same timing. However, in a case in which none of the E_TFC Indexes are satisfactory, it will be assumed that $EtfcIndex_{RSC}=1$. In this case, the power resource will exceed the allocatable remaining power resource to a certain extent, and will be a power resource corresponding to a minimum TBS.

The allocatable wireless resource calculation section 13 calculates an E_TFC Index (EtfcIndexBfS) corresponding to a minimum TBS that satisfies the following formula using an estimated buffer size (step S19 in FIG. 3):

$$EstBfs \leq TBS$$

This enables calculation of a minimum power resource corresponding to the estimated buffer size. However, if EstBfs is 0, it is assumed that $EtfcIndex_{Bfs}=0$.

The allocatable wireless resource calculation section 13 selects, as shown by the following formula, a minimum value among the calculated $EtfcIndex_{PHR}$, $EtfcIndex_{RSC}$ and $EtfcIndex_{Bfs}$ as the E_TFC Index or, in other words, the power resource to be allocated to the mobile station.

$$EtfcIndex = MIN(EtfcIndex_{PHR}, EtfcIndex_{RSC}, EtfcIndex_{Bfs})$$

If EtfcIdx is greater than 0 (step S21 in FIG. 3), since a power resource will be allocated to a mobile station, the allocatable wireless resource calculation section 13 updates AR_RxEudch according to the following formula using a $Squ\beta_d$ corresponding to the power resource to be allocated (step S22 in FIG. 3):

$$AR\_RxEudch = AR\_RxEudch - (Squ\beta_d + Squ\beta_c)*RxDpcch$$

If another mobile station exists for which the calculation processing for determining whether a power resource will be allocated has not been performed (step S23 in FIG. 3), the allocatable wireless resource calculation section 13 returns to step S13. On the other hand, if the calculation processing for determining whether a power resource will be allocated has been performed for all mobile stations (step S23 in FIG. 3), the allocatable wireless resource calculation section 13 concludes processing.

Figure 5:
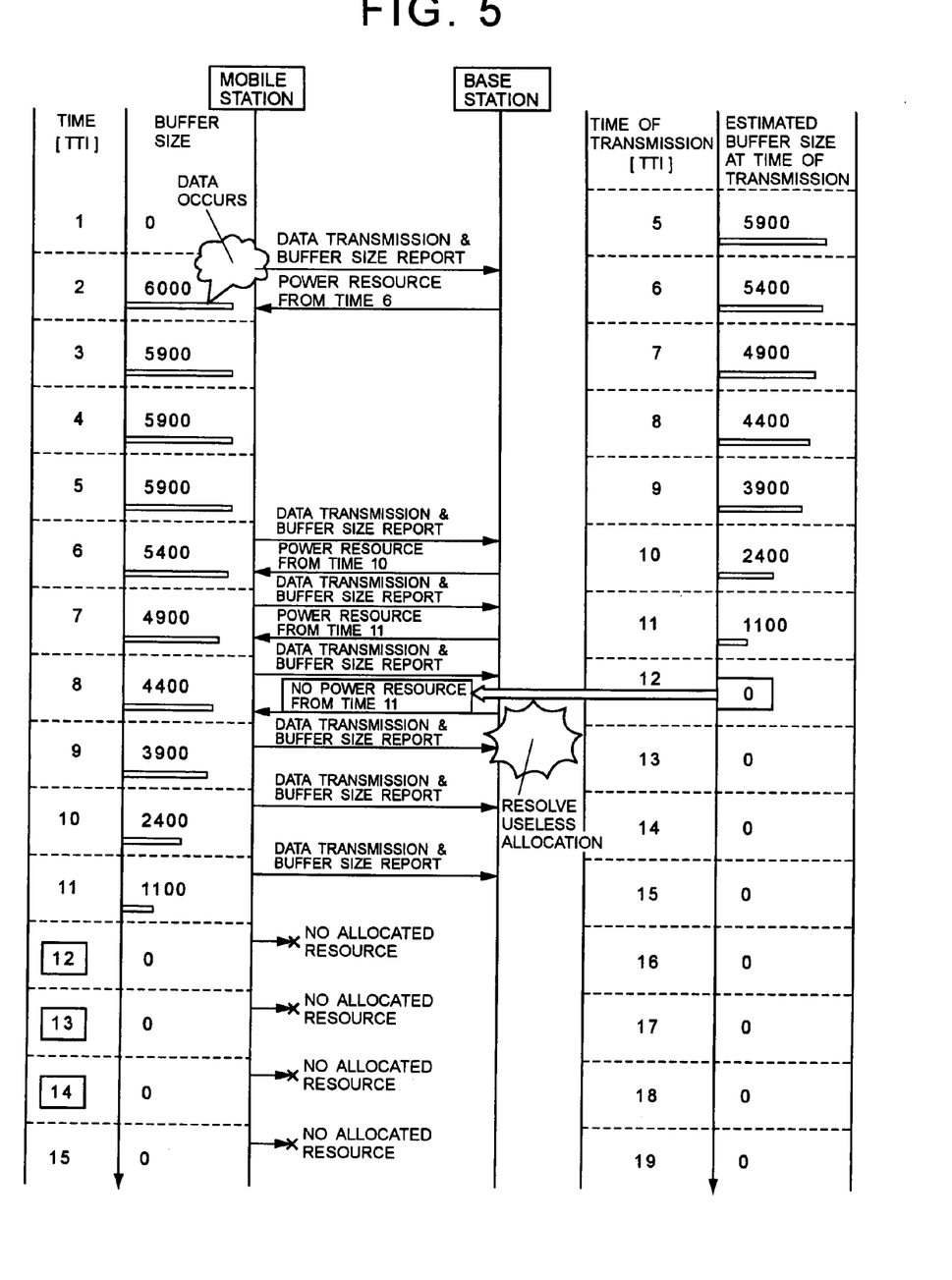
FIG. 5 is a diagram showing an occurrence of transmission data at a mobile station, allocation of a power resource by a base station based on the present invention to the mobile station, and transmission of data by the mobile station based on the allocated power resource.

FIG. 5 is a diagram showing an occurrence of transmission data at a mobile station, allocation of a power resource by a base station based on the present invention to the mobile station, and transmission of data by the mobile station based on the allocated power resource. As compared to FIG. 8, an estimated buffer size at the time of transmission is added to FIG. 5. In other words, since an estimated buffer size is calculated in steps S15 and S16 in FIG. 3 and a power resource to be allocated is determined in step S19 of FIG. 3 using the estimated buffer size, allocation of power resources that have been occurring at time 12-th TTI to 14-th TTI in FIG. 8 can be resolved.

Figure 6:
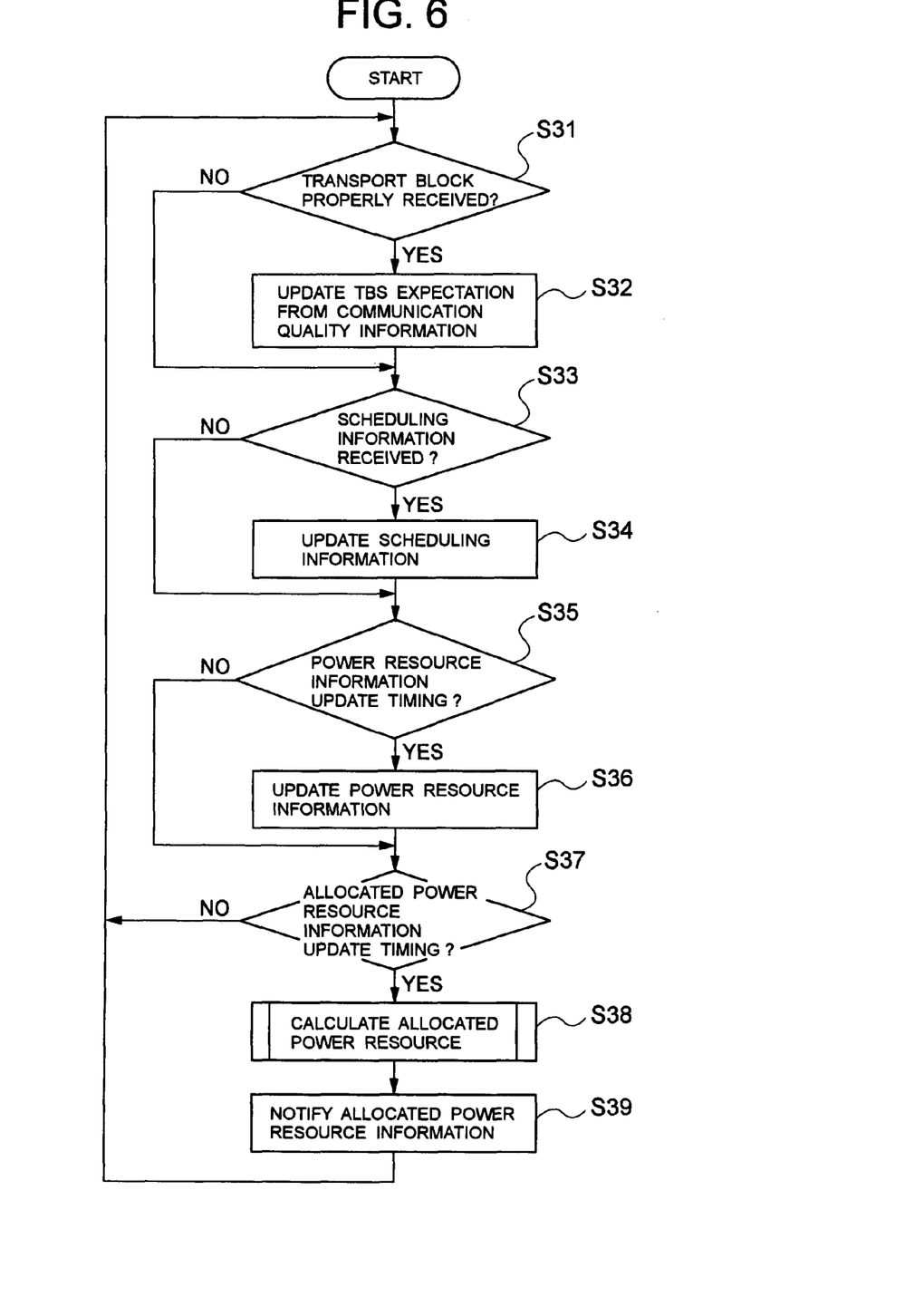
FIG. 6 is a flowchart showing an operation procedure by the base station for allocating a power resource to a mobile station according to another embodiment of the present invention.
Figure 7:
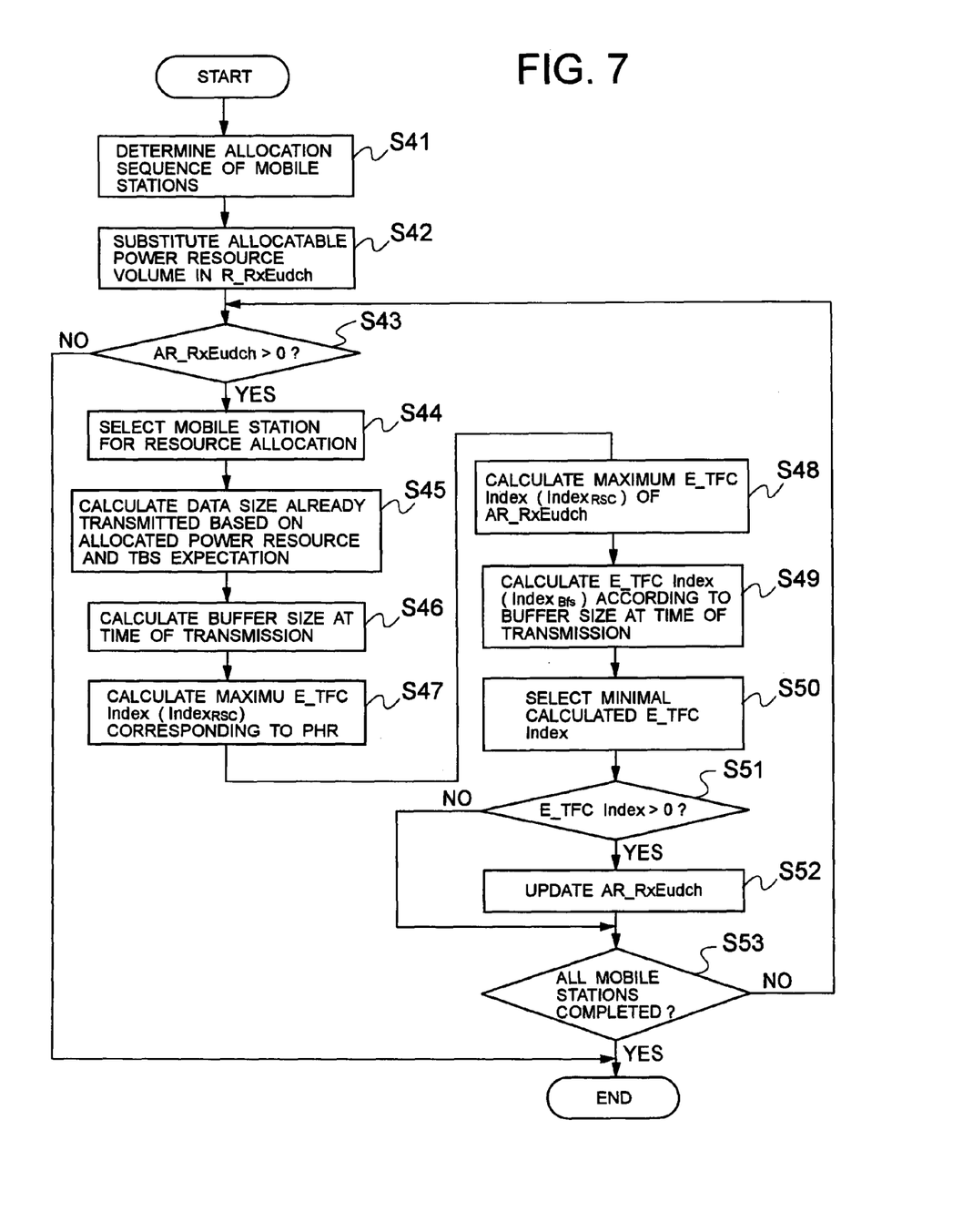
FIG. 7 is a flowchart showing a procedure for calculating a power source to be allocated according to the other embodiment of the present invention.

FIG. 6 is a flowchart showing an operation procedure by the base station for allocating a power resource to a mobile station according to another embodiment of the present invention. FIG. 7 is a flowchart showing a procedure for calculating a power source to be allocated according to the other embodiment of the present invention. The base station according to the other embodiment of the present invention has the same configuration as the base station 1 according to the embodiment of the present invention shown in FIG. 1. The table regarding EUDCH transport blocks shown in FIG. 4 is also similarly configured.

Operations of the base station according to the other embodiment of the present invention will now be described with reference to FIGS. 1, 4, 6 and 7. In FIG. 6, since the processing in steps S33 to S39 are the same as that in the above-described steps S3 to S9 in FIG. 2, a description thereof will be omitted. Additionally, in FIG. 7, since the processing in steps S41 to S44 and steps S46 to S53 are the same as those in the above-described steps S11 to S14 and steps S16 to S23 in FIG. 3, descriptions thereof will be omitted.

Upon receiving a signal from a mobile station, and as long as the signal is an EUDCH transport block and the signal is properly received (step S31 in FIG. 6), the base station operating section 11 notifies the buffer size calculation section 12 of a PHR, which is communication quality information, and calculates a TBS expectation according to a procedure described below (step S32 in FIG. 6).

PHR includes Pmax, which is a maximum transmission power of a mobile station, and Pdpcch, which is DPCCH power. An $AvailSqu\beta_d$, which is an E-DPDCH power offset usable by a mobile station is calculated according to the following formula:

$$AvailSqu\beta_d = (Pmax - Pdpcch)/Pdpcch - Squ\beta_c - \Delta AveSqu\beta_d$$

$\Delta AveSqu\beta_d$ is a coefficient for taking into consideration influences by fading delay, a transport block error rate or the possibility of a case in which the selected mobile station will not perform transmission, and may be set to different values on a per-mobile station-basis or according to the $AvailSqu\beta_d$.

Next, using the table shown in FIG. 4, a maximum TBS that is equal to or less than $AvailSqu\beta_d$ is selected as an instantaneous TBS expectation (InstEstTbs) that is estimated from PHR, which is then used to update TBS expectation according to the following formula:

$$AveEstTbs = West*AveEstTbs + (1-West)*InstEstTbs$$

In the above formula, West represents a weighting coefficient used for averaging, and may be set to 0.

Referring now to FIG. 7, step S15 of FIG. 3 has been changed to step S45. In other words, using a power resource already allocated to the selected mobile station and a TBS expectation (AveEstTbs), a transmitted data size at the time of transmission of the mobile station based on the power resource to be allocated is calculated according to the following formula (step S45 in FIG. 7):

$$TransDataSize = AveEstTbs * N$$

In the above formula, as was the case with the above-described embodiment of the present invention, N represents a number of transmissions that may be performed by the selected mobile station from the time an allocated power resource is notified to the time a transmission is performed based on the notified allocated power resource.

Additionally, in the present invention, as was the case with the above-described embodiment of the present invention, while an estimated buffer size is calculated using a number of possible data transmissions (N) by a selected mobile station, in a case in which a mobile station is continually transmitting data or the like, an estimated buffer size may be calculated using a reported buffer size and a TBS expectation without using the number of possible transmissions.

As described above, with the present invention, by estimating a buffer size at the time of transmission by a mobile station and allocating a wireless resource based on the estimated buffer size, useless allocation of wireless resources may be avoided and utilization efficiency of wireless resources may be improved.

While an exemplary description has been provided on EUDCH, which is a high speed packet transfer scheme in an uplink in the 3GPP, for the above-described embodiments, the present invention may be applied to a system such as an EUTRA using SC-FDMA and the like in which a time of report of a buffer size by a mobile station differs from a time at which a wireless resource, determined using the buffer size, is used. For instance, by applying the present invention to an EUTRA system which uses SC-FDMA, useless allocation of a transmission band to a mobile station with no transmission data may be avoided. In this case, for instance, a reception quality of a pilot channel transmitted by a mobile station may conceivably be used as the communication quality of the mobile station to be used for estimating transmitted data size.

According to the present embodiment, since a data size at the time of transmission may be estimated from a communication quality of a mobile station and a wireless resource may be allocated based on the estimated data size, an advantage is achieved in that useless allocation of wireless resources may be avoided and utilization efficiency of wireless resources may be improved.

What is claimed is:

1. A wireless resource allocation method in which a base station determines an uplink wireless resource available to a mobile station, the method comprising:
   notifying, performed by the mobile station, the base station of a data size to be transmitted;
   measuring, performed by the base station, an uplink communication quality of the mobile station;
   calculating an estimated data size at a time of transmission based on a wireless resource already allocated to the mobile station, performed by the base station, using the data size, a number of transmissions to be performed by the mobile station, and the communication quality; and
   determining, performed by the base station, a next wireless resource to be allocated to the mobile station based on the estimated data size.

2. The wireless resource allocation method according to claim 1, wherein the wireless resource comprises a transmission power of the uplink.

3. The wireless resource allocation method according to claim 1, wherein the wireless resource comprises a transmission band of the uplink.

4. The wireless resource allocation method according to claim 1, wherein the communication quality comprises a transfer rate of the mobile station and the transfer rate is measured in the measuring of the communication quality of the mobile station.

5. The wireless resource allocation method according to claim 1, wherein the communication quality comprises a reception quality of a channel for measuring the communication quality set at the mobile station,
   wherein the method further comprises setting, performed by the base station, the channel at the mobile station, and
   wherein a reception quality of the channel is measured in the measuring of the communication quality of the mobile station, performed by the base station.

6. The wireless resource allocation method according to claim 1, wherein the estimated data size is calculated using a maximum number of data transmissions by the mobile station corresponding to the allocated wireless resource.

7. A wireless resource allocation system in which a base station determines an uplink wireless resource available to a mobile station, the system comprising:
   first means provided at the mobile station for notifying the base station of a data size to be transmitted;
   second means provided at the base station for measuring an uplink communication quality of the mobile station;
   third means provided at the base station for using the data size, a number of transmissions to be performed by the mobile station, and the communication quality to calculate an estimated data size at a time of transmission based on a wireless resource to be allocated to the mobile station; and
   fourth means provided at the base station for determining a wireless resource to be allocated to the mobile station based on the estimated data size.

8. The wireless resource allocation system according to claim 7, wherein the wireless resource comprises a transmission power of the uplink.

9. The wireless resource allocation system according to claim 7, wherein the wireless resource comprises a transmission band of the uplink.

10. The wireless resource allocation system according to claim 7, wherein the communication quality comprises a transfer rate of the mobile station, and
    wherein the second means measures the transfer rate.

11. The wireless resource allocation system according to claim 7, wherein the communication quality comprises a reception quality of a channel for measuring the communication quality set at the mobile station,
    wherein the system further comprises sixth means provided at the base station for setting the channel at the mobile station, and
    wherein the second means measures a reception quality of the channel.

12. The wireless resource allocation system according to claim 7, wherein the third means calculates estimated data size using a maximum number of data transmissions by the mobile station corresponding to the allocated wireless resource.

13. A base station that determines an uplink wireless resource available to a mobile station, the base station comprising:
    means for measuring a communication quality of the mobile station;

means for using a data size to be transmitted, notified from the mobile station to the base station, a number of transmissions to be performed by the mobile station, and the communication quality to calculate an estimated data size at a time of transmission based on a wireless resource to be allocated to the mobile station; and means for determining a wireless resource to be allocated to the mobile station based on the estimated data size.

14. A wireless resource allocation method in which a base station determines an uplink wireless resource available to a mobile station of a plurality of mobile stations, the method comprising:

notifying the base station, by the mobile station, of a data size to be transmitted;

determining an uplink communication quality information of a transmission from the mobile station, by the base station;

calculating an estimated buffer size of the mobile device, performed by the base station, using the data size, a number of transmissions to be performed by the mobile station, and the communication quality at a time of transmission based on a wireless resource to be allocated to the mobile station; and determining, performed by the base station, the wireless resource to be allocated to the mobile station based on the estimated buffer size.

15. The wireless resource allocation method according to claim 14, wherein the determining of the communication quality information comprises the base station measuring a communication quality of the mobile station.

16. The wireless resource allocation method according to claim 14, wherein the communication quality comprises a power head room (PHR) obtained by subtracting a dedicated physical control channel (DPCCH) receiving power of the mobile station from a maximum transmission power for the mobile station.

17. The wireless resource allocation method according to claim 14, wherein the calculating of the estimated buffer size includes calculating the estimated buffer size (EstBfs) according to:

$$\text{EstBfs}=\text{MAX}(\text{Bfs}-\text{TransDataSize}, 0),$$

wherein Bfs represents a buffer size notified from a mobile station, transfer data size (TransDataSize), and MAX (A, B) denotes that A and B will be compared to select a greater value.

18. The wireless resource allocation method according to claim 17, further comprising calculating of the transfer data size (TransDataSize) according to:

$$\text{TransDataSize} = (\text{Ave}Tbs * \Delta\text{Ave}Tbs) * N,$$

wherein $\Delta$AveTbs represents a coefficient equal to or less than 1 representing a transport block error rate, N represents a number of transmissions to be performed by the mobile station from a time when an allocated power resource is notified to a time when a transmission is performed based on the notified allocated power resource, and AveTbs represents an averaged reception size (TBS) for the mobile station.

* * * * *